United States Patent [19]
Huntley et al.

[11] Patent Number: 5,346,111
[45] Date of Patent: Sep. 13, 1994

[54] PORTABLE, PERSONAL COMPUTER, PERSONAL COMMUNICATOR HOLDER

[76] Inventors: James B. Huntley; James Brian Huntley; Tonya M. Huntley; Cornelius L. Burroughs, all of P.O. Box 55287, Washington, D.C. 20040

[21] Appl. No.: 987,827

[22] Filed: Dec. 14, 1992

[51] Int. Cl.$^5$ .............................................. A45F 3/08
[52] U.S. Cl. .................................... 224/265; 224/201
[58] Field of Search ............... 224/201, 265, 266, 272, 224/908, 909

[56] References Cited

U.S. PATENT DOCUMENTS

| | | | |
|---|---|---|---|
| 3,332,593 | 7/1967 | Fauser | 224/265 X |
| 3,363,814 | 1/1968 | Hall, Jr. et al. | 224/908 |
| 4,037,763 | 7/1977 | Turchen | 224/908 |
| 4,526,308 | 7/1985 | Dovey | 224/265 |
| 4,715,293 | 12/1987 | Cobbs | 224/265 X |
| 4,802,211 | 1/1989 | Huntley | 379/454 |

Primary Examiner—Renee S. Luebke

[57] ABSTRACT

A portable, self contained, lightweight personal computer, personal communicator holder device which permits head free, hands free usage is basically of a rectangular configuration in plan and is comprised of two L-shaped components and an obliquely vertical phone support or cradle extended from one end of the L-shaped components and adjusting straps attached thereto, one on each side of the two front corners of the device and one near the middle of the front across the chest L-shaped member, so that they hold the mechanism in place while the holder is being used.

1 Claim, 2 Drawing Sheets

PORTABLE, PERSONAL COMPUTER, PERSONAL COMMUNICATOR HOLDER

This application is related to U.S. Pat. No. 4,552,995 filed Jul. 9, 1983 and U.S. Pat. No. 4,802,211 filed Jul. 7, 1986. Both patents where filed by James B. Huntley and are entitled Portable Cordless Phone Holder.

This invention relates to a completely self contained personal computer, personal communicator and cellular phone holder for use in the home, business, the field, etc. It is not intended, however, that the invention is to be limited to the specific structure nor by the specific construction shown herein. On the contrary, it is intended to cover all modifications and/or alternative construction falling within the scope of the invention as defined in the appended claim.

SUMMARY OF THE INVENTION

The present holder comprises a frame for supporting a telephone and a personal computer which permits the user to have his/her head and hands free during use. It is comprised of two L-shaped components, a vertical arm for supporting the telephone and straps for supporting the computer.

DESCRIPTION OF THE PREFERRED EMBODIMENT

Referring now more in detail to the drawings of the device, the present invention comprises essentially a basically rectangularly-shaped device for resting on the shoulders of the user and substantially made of two L-shaped components 1 and 3 with a hinged connection 3A and an obliquely vertical cordless phone or other type phone holder 4 or cradle attached to and extended from the long leg of 3. Adjusting straps 5 are also connected to hinged connection 3A to permit the user to pass the straps under the arm pits from the rear and in an upward manner toward the front, up and over component 3 at the juncture of the legs of 3, to the left of 2 so that it may be drawn downward through a plate with a hole in for adjusting to the various size persons and thus stabilizing the entire mechanism for effective operation.

Figure 1:
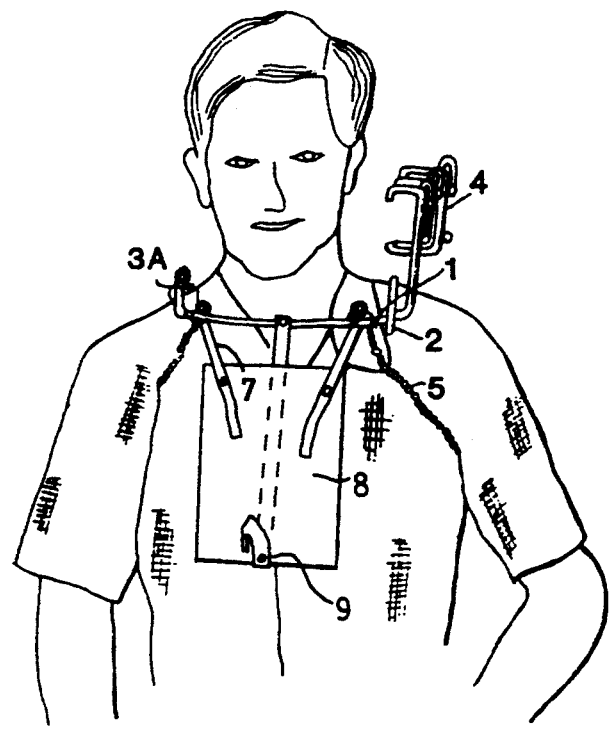
FIG. 1 is a front view of the personal computer or personal communicator in place while also showing the cellular phone holder in place.
Figure 2:
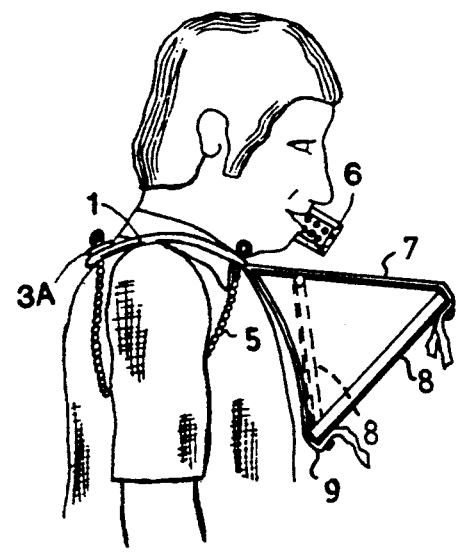
FIG. 2 is a side view of the personal computer or personal communicator while showing the connection of the adjustable top straps of the communicator and how they connect and the position of the device when it rests on the chest prior to sliding it down to lap top or "non use" position shown dotted or to the flat position on the lap itself.
Figure 3:
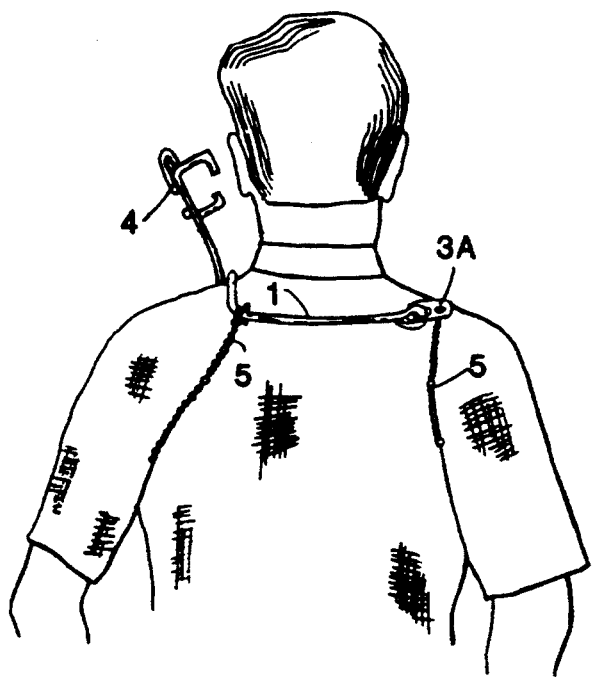
FIG. 3 is a rear view of the user showing the hinged connection of the two L-shaped components.
Figure 4:
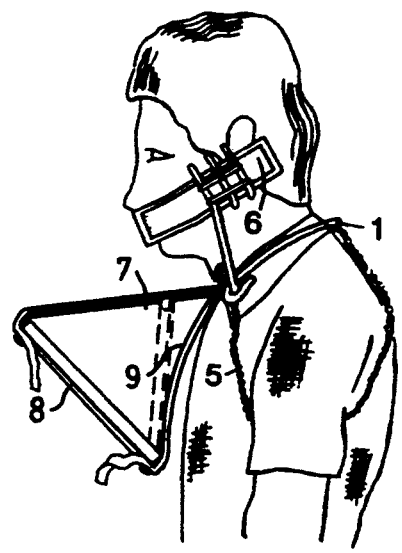
FIG. 4 is a right side view of the user.
Figure 5:
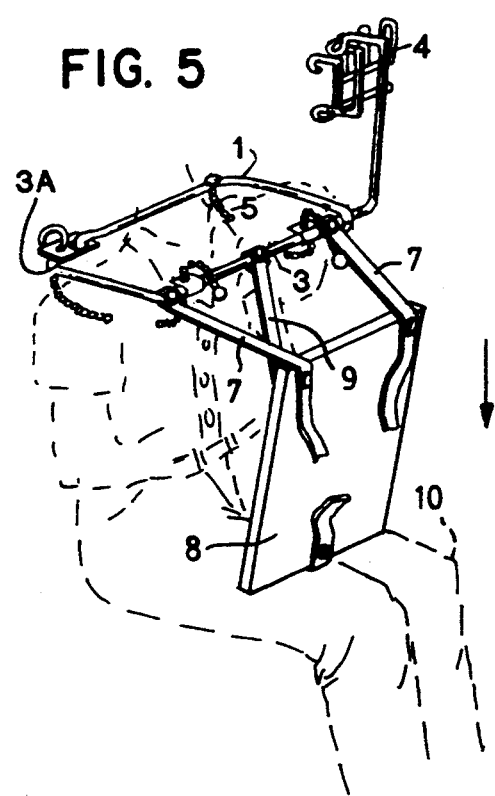
FIG. 5 is a general isometric of the entire mechanism.

The adjustable two top straps 7 for holding the personal computer, personal communicator or similar device 8 are anchored to the opposite end of the curved front horizontal bar 3 while the lower adjustable strap 9 is anchored to the middle of the horizontal bar 3 for supporting the above device. The straps 7, 9 contain a plurality of female snap portions and the device 8 comprises mating male snap portions. The male and female snaps are strategically placed so that when the personal computer, personal communicator or similar device 8 is in place they may be operated without the use of the hands, to hold the device or use the cellular phone 6. Thus the hands are free for doing other things. The device of the present invention may be used while standing (as shown in FIG. 4) with the computer fully suspended from the L-shaped components 1, 3 or while seated (as shown in FIG. 5) with the computer partially supported on the user lap 10.

What is claimed is:

1. An apparatus for supporting a telephone headset comprising first and second members and an adjustable strap means;

the first member comprising first and second legs forming a substantially L-shaped section wherein the first leg is short relative to the second leg, the second longer leg is adapted to be positioned across a user's chest and the first leg extends from one end of the second leg over one of the user's shoulders, the first member further includes a substantially vertical section extending from the other end of the second leg and upwardly from the user's shoulder, wherein the substantially vertical section comprises a bracket means for attaching the telephone handset;

the second member comprising third and fourth legs forming a substantially L-shaped section wherein the third leg is shorter relative to the fourth leg, the fourth leg is attached to the other end of the first leg and the third short leg is adjacent to the vertical section wherein the four legs, when connected, form a substantially rectangular configuration having two rear corners and two front corners;

the adjustable strap means comprising two adjustable straps wherein each adjustable strap extends from adjacent one rear corner, under one of the user's armpits to a point adjacent to one front corner of the substantially rectangular configuration; whereby fastening and adjusting the strap means under the user's arms provides for comfort and stability:

the apparatus further comprising three straps configured to support a computer or communicating device in a raised stable position or a lowered stable position; two of the straps attached to the second leg, wherein the two straps are attached at opposite ends of the second leg and are secured to the personal computer or communicating device; the third strap being secured to the second leg approximately midway between the first two straps and at a bottom point of the computer or communicating device.

* * * * *